United States Patent
Marklund

(10) Patent No.: US 6,493,092 B1
(45) Date of Patent: Dec. 10, 2002

(54) METHOD AND APPARATUS FOR INTERFEROMETRIC MEASUREMENT

(75) Inventor: Olov Marklund, Luleå (SE)

(73) Assignee: Jerker Delsing, Piteå (SE)

( * ) Notice: Subject to any disclaimer, the term of this patent is extended or adjusted under 35 U.S.C. 154(b) by 0 days.

(21) Appl. No.: 09/787,550

(22) PCT Filed: Jun. 1, 2001

(86) PCT No.: PCT/SE99/01748

§ 371 (c)(1),
(2), (4) Date: May 21, 2001

(87) PCT Pub. No.: WO00/20824

PCT Pub. Date: Apr. 13, 2000

(30) Foreign Application Priority Data

Oct. 1, 1998 (SE) ............................................ 9803326

(51) Int. Cl.$^7$ ................................................. G01B 9/02
(52) U.S. Cl. ......................... 356/489; 356/484; 356/512
(58) Field of Search ................................. 356/484, 485, 356/489, 496, 511, 512

(56) References Cited

U.S. PATENT DOCUMENTS 5,532,813 A * 7/1996 Ohishi et al. ................ 250/553
6,137,573 A * 10/2000 Luke et al. .................. 356/453

FOREIGN PATENT DOCUMENTS

EP  0506296 A2  9/1992
EP  0506297 A2  9/1992

OTHER PUBLICATIONS

De Groot, Peter, "Three-color laser-diode interferometer." Applied Optics, vol. 30, No. 25, Sep. 1, 1991, pp. 3612–3616.

* cited by examiner

Primary Examiner—David V. Bruce
(74) Attorney, Agent, or Firm—Burns, Doane, Swecker & Mathis, LLP

(57) ABSTRACT

A method for interferometric measurement comprises emitting waves onto a reference surface (1) and onto a measured object (2), which each reflects a part of the emitted waves, and receiving both the reflected parts of the waves by the same receiver (4). In the receiver the parts of the waves generate a representation of the measured object (2) in the form of an interferogram, from which the form of the measured object (2) is determined. The emitted waves comprise waves of three well-defined wavelengths $v_1$, $v_2$ and $v_3$, where $v_1 \neq v_2 \neq v_3$, which wavelengths are chosen to substantially satisfy the mutual relation $v_1 = (v_2 \cdot v_3)/(2 \cdot v_3 - v_2)$ and generate an interferogram each in the receiver (4). An apparatus suited to implement the method comprises a light source (3) for emitting light, a reference surface for reflecting a first part of said light, and a receiver (4) which is arranged to receive the first part of the light and a second part of the light, reflected by a measured object (2). The light source is arranged to simultaneously emit light of the three above-mentioned well-defined wavelengths.

20 Claims, 2 Drawing Sheets

METHOD AND APPARATUS FOR INTERFEROMETRIC MEASUREMENT

Figure 1:
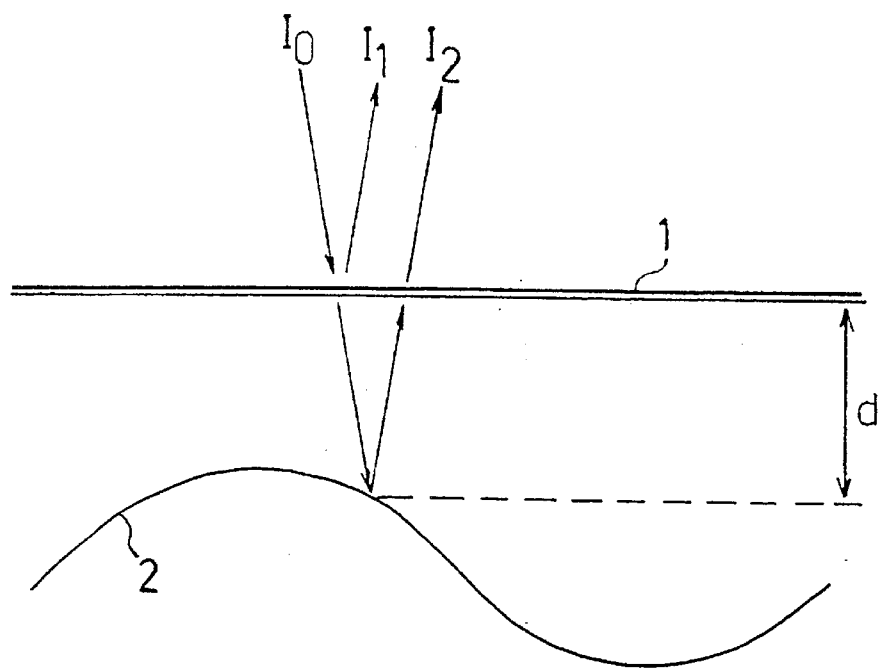

This invention relates to a method for interferometric measurement, which method comprises emitting waves onto a reference surface and onto a measured object which each reflect a part of the emitted waves, and receiving both the reflected parts of the waves by one and the same receiver, in which a representation of the measured object is generated from the reflected parts of the waves in the form of an interferogram, from which the form of the measured object is determined.

In addition to the method this invention also relates to an apparatus for interferometric measurement which includes a light source for emitting light, a reference surface for reflecting a first part of said light and a receiver which is arranged to receive the first part of the light and a second part of the light, reflected by an object, a representation of the measured object being generated in said receiver in the form of an interferogram from which the form of the measured object is determinable.

Optical interferometry is often used for non-contact measurement of the form of surfaces. For this purpose light which has been separated into two parts by the use of a prism, a semitransparent mirror or some other device is employed. One of these parts of the light illuminates and is reflected by a plane reference surface. The other part of the light illuminates and is reflected by the surface, the form of which is to be measured. The two reflected parts of the light are brought together to illuminate photographic film or some form of light recording electronics. The image thus produced is called an interferogram. From the interferogram the form of the surface can be determined. One example of an apparatus for Producing interferograms is shown schematically in FIG. 1.

In those cases where the light employed is monochromatic, i.e. all the light is of one and the same wavelength, the interferogram consists of light and dark regions. The lightest regions are generated where the two reflected parts of the light interfere constructively, i.e. where they are in phase. This is the case when the total distance (from the light source to the recording medium) is the same for the two parts of the light or when it differs by a whole number of wavelengths. The darkest regions are generated where the two reflected parts of the light interfere destructively, i.e. where they are in opposite phase. This is the case when the total distance (from the light source to the recording medium) for the two parts of the light differs by half a wavelength in addition to a whole number of wavelengths.

In those cases where the light employed is white, i.e. when the light is composed of light of different wavelengths, the interferogram consists of differently coloured regions. Light of one wavelength in the two reflected light components may interfere constructively in the same point where light of a different wavelength interferes destructively. In this way the spectral composition of the reflected light changes, i.e. the reflected light has a hue (dominant wavelength) as opposed to the case for the light source employed.

By analysing the changes in the interferogram, in intensity in monochromatic interferograms, in hue and possibly also intensity and saturation in interferograms recorded with white light sources, the position and form of the surface can be determined, although not always unambiguously.

When a monochromatic light source is employed, the surface can be translated in steps of half wavelengths (i.e. the total distance the light travels changes in steps of whole wavelengths) without changes in the interferogram. The determination of the position of the surface thus is ambiguous. Besides there is an ambiguity in the determination of the form of the surface—an indentation in the surface may result in the same interferogram as a protuberance in the surface.

By employing a light source which emits white light, these ambiguities can be eliminated. However, the interval within which the form and position of the surface can be determined becomes very small, in the order of microns. Outside of this narrow interval so many interferences occur, both constructive and destructive, that the interferogram cannot be interpreted due to low colour saturation. In order to determine the position and form of a surface unambiguously, it is necessary to calibrate the instrumentation with the aid of a surface in an accurately known position and having an accurately known form (e.g. a spherical ball with known diameter, fastened in a fixed jig).

There are a number of important technical applications for measuring position and form within a very narrow interval. With a monochromatic light source it is then possible to eliminate ambiguities in the determination of the form of the surface by recording several (at least three) interferograms of the same surface with different displacements of the two light parts (e.g. a semitransparent mirror can be moved, see FIG. 2). This is called phase-stepping interferometry.

There are two kinds of phase-stepping interferometry. In the one kind, temporal phase-stepping, the interferograms are generated consecutively in time and it is thus assumed that the position and form of the surface is not changed during the time required to record all the necessary interferograms. In the other kind, usually called spatial phase-stepping, the different interferograms are generated simultaneously. This can be arranged in several different ways, e.g. by employing light with different polarisation angles. The instrumentation then is more extensive (e.g., three cameras must be used instead of one) but the form of the surface may change, which is necessary in many important applications.

In each of the references EP-A-506 296, EP-A-0 506 297 and the paper "Three-color laser-diode interferometer", published in the journal Applied Optics, Vol. 30, No. 25, 1991, a method of extending the measurement range within which the structure of an object can be unambiguously determined is presented. This method is based on the employment of so-called synthetic wavelengths. Two monochromatic light rays with closely spaced wavelengths $\lambda_1$, $\lambda_2$, are generated by a laser diode and are directed onto the measured object. These light rays cooperate to generate a light ray with a so-called synthetic wavelength $\Lambda_{12}^{-1}=\lambda_1^{-1}-\lambda_2^{-1}$, which is much longer than the individual wavelengths $\lambda_1$, $\lambda_2$ and therefore allows an unambiguous determination of larger structures of the measured object. In practice, however, two separate interferograms are detected, one for each of the wavelengths $\lambda_1$ and $\lambda_2$, from which information about the structure of the measured object can be extracted. These two interferograms are detected through temporal phase-stepping, and thus this method exhibits the aforementioned disadvantages. The two wavelengths $\lambda_1$ and $\lambda_2$ also must be very closely spaced, typically within 0.5 nm, and therefore the differences between the two measured interferograms are small which results in poor measurement accuracy. In practice therefore, in order to obtain an enhanced analysis of the structure of the measured object, one or several additional synthetic wavelengths, generated by combinations of light rays of different wavelengths and shorter than the first synthetic wavelength $\Lambda_{12}$ are employed. The choice of synthetic wavelengths is determined by the wavelengths which are available from laser diodes of multimode type.

Against this background the object of the present invention is to overcome the disadvantages associated with the known technology and particularly with both the known phase-stepping solutions, since these solutions are otherwise very advantageous.

In accordance with the invention, this object is achieved by a method as described in the introduction by the emitted waves comprising waves of three well-defined wavelengths $v_1$, $v_2$ and $v_3$, where $v_1 \neq v_2 \neq v_3$, which wavelengths are chosen so that they substantially satisfy the mutual relation $$v_1 = (v_2 \cdot v_3)/(2 \cdot v_3 - v_2)$$

and generate an interferogram each in the receiver.

In accordance with the method, phase-stepping is thus achieved by the emitted waves comprising waves the wavelengths of which are all different but adapted to each other. Since it is possible to generate these three wavelengths by simpler means than e.g. the aforementioned light with different polarisation angles and since the mutual relation is considerably simpler to handle, and additionally generates simultaneous interferograms, it is realised that the method in accordance with the invention overcomes the problems heretofore associated with phase-stepping. It is also realised that the invention is well applicable to other kinds of waves than the optic waves normally associated with phase-stepping. Finally it is realised that corresponding expressions for any of the other wavelengths, expressed in the two remaining wavelengths, can be given.

By well-defined wavelength for each one of the waves mentioned it is understood that the ratio between the spectral width ($\Delta v$) and the mean wavelength ($v$) for each wave is much smaller than 1. If one or several of the waves employed have too large spectral width compared to their mean wavelength, the corresponding interferogram will exhibit such large disturbances that the resulting measurement accuracy will be insufficient.

In accordance with the method of the invention, three interferograms ($E_1$, $E_2$, $E_3$) are detected simultaneously. These three interferograms can mathematically be expressed as:

$$\begin{cases} E_1 = A + B \cos\left(\frac{\beta d}{v_1}\right) \\ E_2 = A + B \cos\left(\frac{\beta d}{v_2}\right) \\ E_3 = A + B \cos\left(\frac{\beta d}{v_3}\right) \end{cases}$$

where A and B are arbitrary constants, $\beta$ is known and depends on the refractive index, and d is the sought quantity. The three wavelengths ($v_1$, $v_2$, $v_3$) are chosen to satisfy the equations:

$$\begin{cases} \frac{1}{v_1} = \Phi_0 - \Delta\Phi \\ \frac{1}{v_2} = \Phi_0 \\ \frac{1}{v_3} = \Phi_0 + \Delta\Phi \end{cases}$$

where $\Phi_0$ and $\Delta\Phi$ are arbitrary constants. The latter system of equations yields the interdependency $v_1 = (v_2 \cdot v_3)/(2 \cdot v_3 - v_2)$ between the wavelengths. This particular choice of wavelengths is explained by the fact that by algebraic manipulation, linear combinations N and D in accordance with:

$$N = E_1 - E_3 = 2B \sin(\beta d\Phi_0)\sin(\beta d\Delta\Phi)$$

$$D = 2E_2 - E_1 - E_3 = 2B \cos(\beta d\Phi_0)(1 - \cos(\beta d\Delta\Phi))$$

can be obtained.

The linear combinations N and D are quantities which can be measured from the simultaneously detected interferograms ($E_1$, $E_2$, $E_3$), and in accordance with that stated above, $\beta$, $\Phi_0$ and $\Delta\Phi$ are known quantities. From these linear combinations the equation:

$$\tan(\beta d\Phi_0) = \frac{N}{D}\tan(\beta d\Delta\Phi/2)$$

is obtained. This equation can be solved for the unknown quantity d with some suitable numerical method.

More concrete and applied to optical wavelengths, the receiver or the recording medium (colour film or colour video) in accordance with the invention thus simultaneously records three different interferograms, one for each wavelength. The difference in total distance travelled by the two parts of the light (the part of the light which is reflected by the reference surface and that part of the light which is reflected by the surface, the position and form of which is to be determined) expressed in number of wavelengths will then be different for different wavelengths and the phase displacement between the two components will therefore be different in the three different interferograms. Therefore a kind of phase-stepping interferomety has been achieved. The special relation between the different wavelengths which is required in accordance with the invention then makes it possible to determine the position and form of the surface from the three interferograms even when there are relatively large variations in the surface.

In the method according to the invention, either electromagnetic or mechanical waves are employed. The former are typically light waves in the visual spectrum and/or neighbouring intervals, i.e. the UV and IR intervals, since reliable sources and receivers for electro-magnetic waves in these intervals are available. According to a preferred embodiment, the light waves have the wavelengths $\lambda_R$, $\lambda_G$ and $\lambda_B$, where R, G and B represent the hues red, green and blue since these hues are suited for receivers in the form of an ordinary photographic film or a video camera. The electromagnetic waves, however, can be in an arbitrary wavelength range, preferably in a range where reliable transmitters and receivers are available, such as the radio or X-ray range, if this is estimated to be advantageous on a specific measuring occasion.

Among mechanical waves in this context sound waves (acoustic waves) are the most important. The depth of penetration of these waves depends on their wavelength and they are particularly useful for non-transparent objects. In this context ultrasound waves are preferable since reliable transmitters and receivers are available.

Besides the method, the present invention relates to an apparatus of the type mentioned in the introduction, which is particularly intended for the application of the method when light is employed. In the apparatus in accordance with the invention, more particularly the light source is designed to simultaneously emit light of three well-defined wavelengths $v_1$, $v_2$ and $v_3$, where $v_1 \neq v_2 \neq v_3$, which wavelengths are chosen to substantially satisfy the mutual relation $$v_1 = (v_2 \cdot v_3)/(2 \cdot v_3 - v_2)$$

and generate an interferogram each in the receiver.

A thus designed apparatus is very simple in its construction as compared to the aforementioned solutions for phase-stepping interferometry but still constitutes a well-functioning unit in practice.

This applies particularly if the light source comprises a lamp for emitting white light, a light splitter for splitting the light from the lamp into three parts and an interference filter for each such part, the interference filters being arranged to transmit light of one of the three well-defined wavelengths $v_1$, $v_2$ and $v_3$, one for each filter. In this embodiment, the invention thus makes it possible to determine the form of a surface also from interferograms which have been obtained by means of a light source emitting white light. The essential advantage of this is that no calibration, involving a known surface, is necessary. Besides the problem relating to colour saturation outside of a narrow interval is elimlnated and the form of the surface may therefore vary within a larger interval than before.

Figure 2:
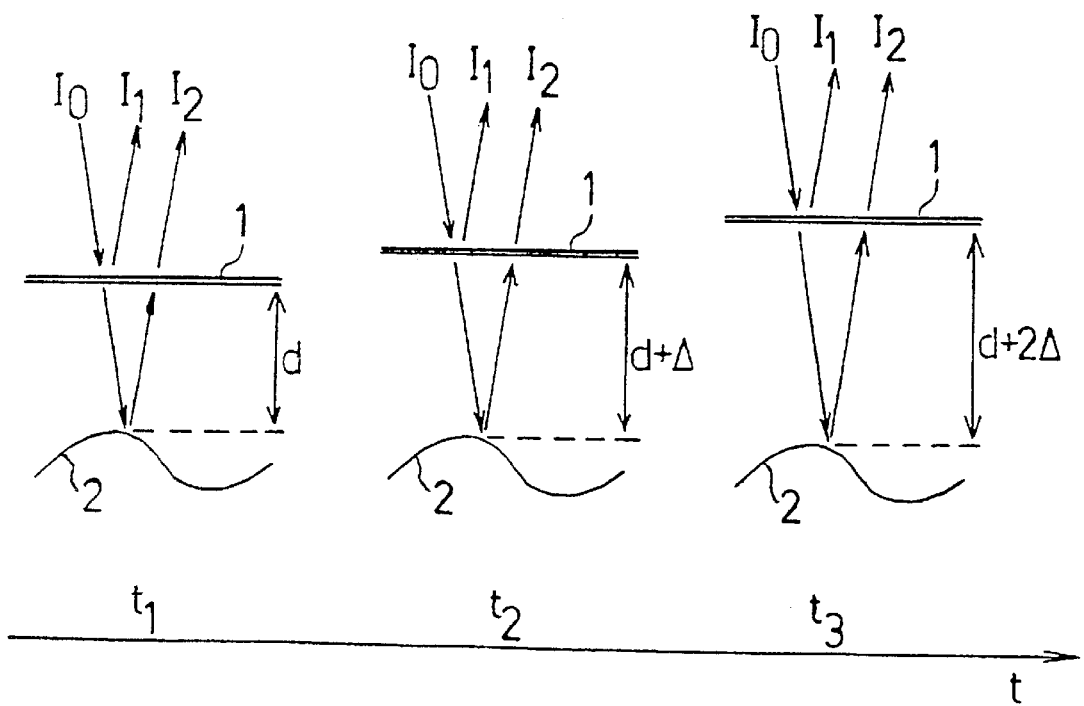
Figure 3:
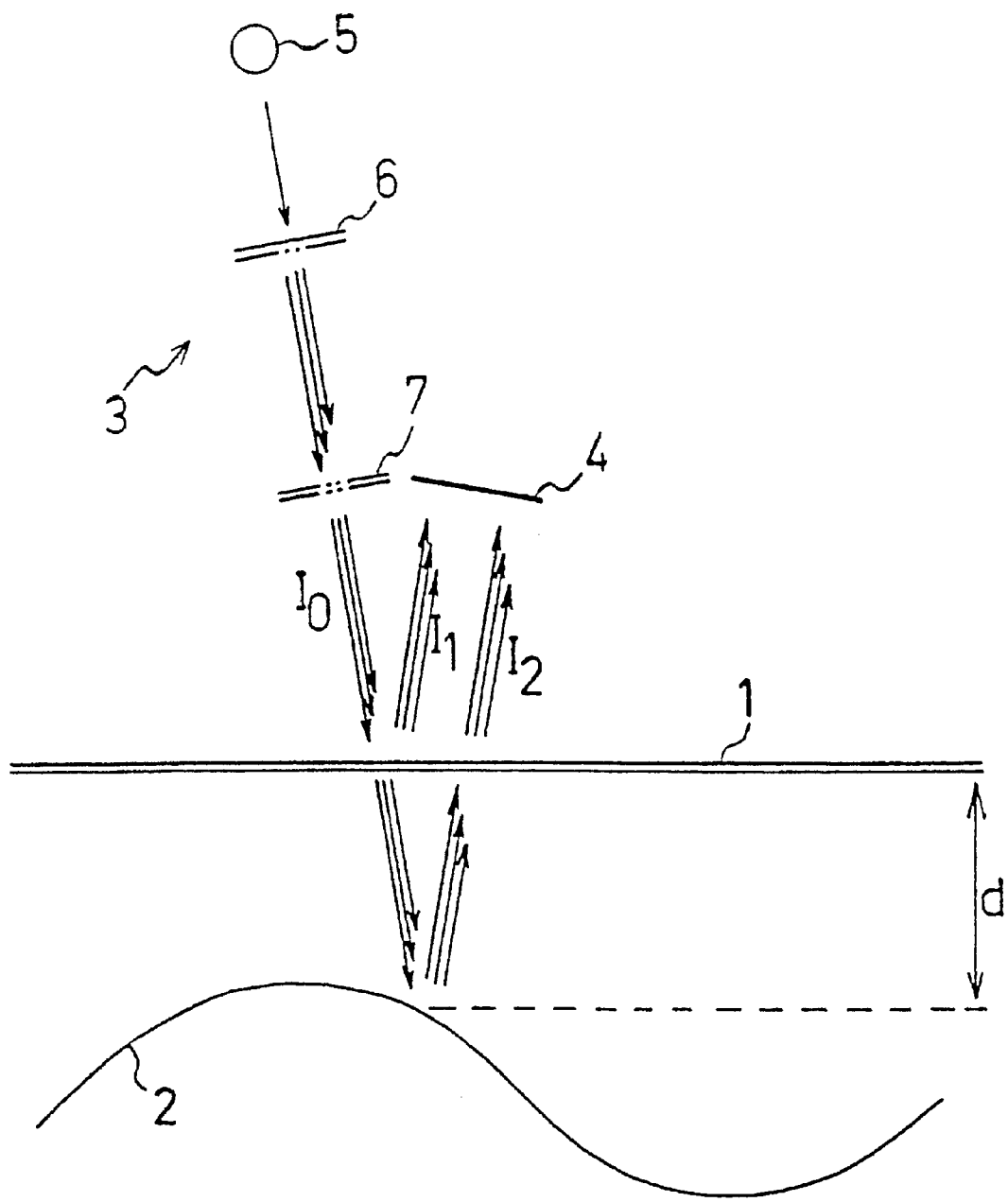

The invention will be described in more detail below with reference to the accompanying drawings, in which FIG. 1, as mentioned above, schematically shows a traditional apparatus for interferometric measurement, FIG. 2, which has also been mentioned above, schematically shows an apparatus for interferometric measurement using phase-stepping, and FIG. 3 schematically shows an apparatus for interferometric measurement in accordance with one embodiment of the invention.

In FIG. 1, which was mentioned in the introduction, $I_0$ represents light which impinges obliquely from above upon a semitransparent mirror which forms a reference surface 1. A first part $I_1$ of the light is reflected and collected by a receiver which is not shown in FIG. 1. A second part $I_2$ of the light is transmitted through the mirror and is reflected by a measured object 2, the surface of which is to be determined. The light $I_2$ which is reflected by the measured object 2 is again transmitted through the mirror and is also collected by the receiver. In the receiver an interferogram is generated, the appearance of which primarily depends on the distance d between the reference surface 1 and the surface of the measured object 2.

In FIG. 2, which was also mentioned in the introduction, an apparatus corresponding to the one in FIG. 1 is also employed. The references to the parts are the same in FIG. 2 as in FIG. 1. The apparatus in FIG. 2 is intended to use the mentioned phase-stepping interferometry, more exactly the kind known as temporal phase-stepping. Three measurements consecutive in time t are made, between which the reference surface 1 is displaced in relation to the measured object 2 so that the distance d between them is altered. At time $t_1$ the distance may be e.g. d, at time $t_2$ it may be e.g. d+Δ and at time $t_3$ it may be e.g. d+2Δ.

In FIG. 3 an apparatus in accordance with the invention is shown. The references to the parts in FIG. 1 and FIG. 2 are also used in FIG. 3. The difference from the apparatuses earlier shown is that the light source 3 is arranged in a particular way and that the receiver 4 is shown at least schematically. The light source 3 according to the shown embodiment of the invention contains a lamp 5, which is arranged to emit white light and can thus be of a very simple design. The lamp illuminates a light splitter 6, which is arranged to split the light from the lamp 5 into three parts. These three parts are then transmitted through interference filters 7 which are also part of the light source. The interference filters transform the light to light of three different wave-lengths $\lambda_R$, $\lambda_G$ and $\lambda_B$, respectively, where the suffixes R, G and B respectively denote the hues red, green and blue respectively. Each interference filter 7 has a transmission profile, the spectral width of which is preferably approx. 5–10 nm or less. With a spectral width of 25 nm usable results are also obtained, although the measurement accuracy will be lower. The transmitted light $I_0$ impinges, after reflection against the reference surface 1 or after transmission through the same and reflection against the surface of the measured object 2 and renewed transmission through the reference surface 1, upon the receiver 4. In this receiver three different interferograms are generated, one for each wavelength, and therefore also very cumbersome surfaces of the measured object 2 can be determined without any alteration at all of the distance d between the reference surface 1 and the measured object 2.

Those skilled in the art realise that the invention can be used also to determine the thickness of a layer between a reference surface and a measured object. As an example a lubrication layer between interacting machine elements, such as roller bearings and gears, may be mentioned. Due to the non-conforming nature of the interacting surfaces of the machine elements, very high contact pressures (in the order of GPa) may develop. As a consequence the surfaces will undergo elastic deformation.

In these particular circumstances, the parameter which is desirable to measure is the thin lubricant film which separates the surfaces from each other since this lubricant film determines the life of the interacting machine elements. For example, in the case of roller bearings the measurement of the lubricant film is performed using a measurement device where the roller element (e.g. a steel ball) is an original machine element, whereas the bearing housing has been replaced by a safire glass disk which has been coated with a very thin chromium layer on its underside. In this case the chromium layer constitutes the reference surface and the roller element is the measured object and the layer thickness sought is represented by the distance between these which can be measured in accordance with the invention.

Those skilled in the art also realise that the reference surface also may be formed of a film layer, which in some way has been directly applied onto the measured object such that a first part of a wave is reflected by this layer, whereas a second part of a wave is reflected by the measured object.

It may also be mentioned that the receiver may comprise three detectors, each arranged to receive a respective one of the waves and appropriately tuned to the wavelength of this wave. When light waves in the optical wavelength interval are employed, the receiver may be e.g. a video camera. Alternatively the receiver may be formed of three separate detector devices, such as matrix detectors.

Finally it is also obvious that in dynamic circumstances it is possible to repeatedly and simultaneously emit waves which have been split into waves of different wavelengths in accordance with the invention and thereby achieve time-discretised measurement, and that in static circumstances it is possible (exactly as in the case of the known phase-stepping interferometry) to divide in time the emission of the waves split into wave of different wavelengths according to the invention.

What is claimed is:

1. A method for interferometric measurement, which method comprises emitting waves onto a reference surface (1) and onto a measured object (2), which each reflect a part of the emitted waves, and receiving both the reflected parts of the waves by one and the same receiver (4), in which a representation of the measured object (2) is generated from the reflected parts of the waves in the form of an interferogram, from which the form of the measured object (2) is determined, characterised in that the emitted waves comprise waves of three well-defined wavelengths wavelengths $v_1$, $v_2$ and $v_3$, where $v_1 \neq v_2 \neq v_3$, which wavelengths are chosen to substantially satisfy the mutual relation $$v_1 = (v_2 \cdot v_3)/(2 \cdot v_3 - v_2)$$

and generate an interferogram each in the receiver (4).

2. The method as claimed in claim 1, characterised in that several sets of waves are emitted with time spaces in between.

3. The method as claimed in claim 1, characterised in that the waves are mechanical waves.

4. The method as claimed in claim 3, characterised in that several sets of waves are emitted with time spaces in between.

5. The method as claimed in claim 3, characterised in that the mechanical waves are sound waves, preferably ultrasound waves.

6. The method as claimed in claim 5, characterised in that several sets of waves are emitted with time spaces in between.

7. The method as claimed in claim 1, characterised in that the waves are electromagnetic waves.

8. The method as claimed in claim 7, characterised in that several sets of waves are emitted with time spaces in between.

9. The method as claimed in claim 7, characterised in that the electromagnetic waves are X-rays.

10. The method as claimed in claim 9, characterised in that several sets of waves are emitted with time spaces in between.

11. The method as claimed in claim 7, characterised in that the electromagnetic waves are radio waves.

12. The method as claimed in claim 11, characterised in that several sets of waves are emitted with time spaces in between.

13. The method as claimed in claim 7, characterised in that the electromagnetic waves are light waves.

14. The method as claimed in claim 13, characterised in that several sets of waves are emitted with time spaces in between.

15. The method as claimed in claim 13, characterised in that the light waves are in the visible range.

16. The method as claimed in claim 15, characterised in that several sets of waves are emitted with time spaces in between.

17. The method as claimed in claim 15, characterised in that the light waves have the wave lengths $\lambda_R$, $\lambda_G$ and $\lambda_B$, where the suffixes R, G and B denote the hues red, green and blue respectively.

18. The method as claimed in claim 17, characterised in that several sets of waves are emitted with time spaces in between.

19. An apparatus for interferometric measurement, comprising a light source (3) for emitting light, a reference surface (1) for reflecting a first part of the light and a receiver (4), which is arranged to receive the first part of the light and a second part of said light, reflected by a measured object (2), a representation of the measured object (2) being generated in the receiver (4) in the form of an interferogram, from which the form of the measured object (2) is determinable, characterised in that the light source is arranged to simultaneously emit light of three well-defined wavelengths $v_1$, $v_2$ and $v_3$, where $v_1 \neq v_2 \neq v_3$, which wavelengths are chosen to substantially satisfy themutual relation $$v_1 = (v_2 \cdot v_3)/(2 \cdot v_3 - v_2)$$

and generate an interferogram each in the receiver (4).

20. The apparatus as claimed in claim 19, characterised in that the light source (3) comprises a lamp (5) for emitting white light, a light splitter (6) for splitting the light from the lamp (5) into three parts and an interference filter (7) for each such part, the interference filters (7) being arranged to transmit light of one of the three well-defined wavelengths $v_1$, $v_2$ and $v_3$, one for each filter.

* * * * *

UNITED STATES PATENT AND TRADEMARK OFFICE
CERTIFICATE OF CORRECTION

PATENT NO.    : 6,493,092 B1
DATED         : December 10, 2002
INVENTOR(S)   : Olov Marklund It is certified that error appears in the above-identified patent and that said Letters Patent is hereby corrected as shown below:

<u>Title page,</u>
Item [22], is corrected to read:

-- PCT Filed:  Oct. 1, 1999 --

Signed and Sealed this

Fifteenth Day of April, 2003

JAMES E. ROGAN
*Director of the United States Patent and Trademark Office*